United States Patent
Vakil et al.

(10) Patent No.: US 8,320,878 B2
(45) Date of Patent: Nov. 27, 2012

(54) CHARGING SYSTEM FOR A COMMUNICATION SYSTEM

(75) Inventors: Faramak Vakil, Long Grove, IL (US); Dragan M. Boscovic, South Barrington, IL (US); Marco Fratti, St-Germain-en-Laye (FR); Surender Kumar, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 983 days.

(21) Appl. No.: 12/123,606

(22) Filed: May 20, 2008

(65) Prior Publication Data

US 2009/0291667 A1    Nov. 26, 2009

(51) Int. Cl.
*H04M 11/00* (2006.01)

(52) U.S. Cl. ........ 455/406; 455/405; 455/407; 455/408; 455/409; 379/114.03; 379/114.21; 379/114.22; 379/114.23; 379/114.28

(58) Field of Classification Search .......... 455/405–409; 379/114.03, 114.21, 114.22–114.23, 114.28–114.29, 379/115.01
See application file for complete search history.

(56) References Cited

U.S. PATENT DOCUMENTS

| | | | |
|---|---|---|---|
| 6,699,188 B2 | 3/2004 | Wessel | |
| 6,735,601 B1 | 5/2004 | Subrahmanyam | |
| 6,856,598 B1 | 2/2005 | Stanfield | |
| 6,874,018 B2 * | 3/2005 | Wu | 709/219 |
| 6,944,662 B2 | 9/2005 | Devine et al. | |
| 6,977,997 B2 * | 12/2005 | Shioda et al. | 379/114.13 |
| 7,027,799 B2 | 4/2006 | Morin et al. | |
| 7,181,493 B2 | 2/2007 | English et al. | |
| 7,194,543 B2 | 3/2007 | Robertson et al. | |
| 2002/0095399 A1 | 7/2002 | Devine et al. | |
| 2003/0093314 A1 * | 5/2003 | Leung et al. | 705/14 |
| 2003/0144860 A1 | 7/2003 | Casati et al. | |
| 2003/0191679 A1 | 10/2003 | Casati et al. | |
| 2004/0210524 A1 * | 10/2004 | Benenati et al. | 705/40 |
| 2004/0259553 A1 * | 12/2004 | Delaney et al. | 455/445 |
| 2005/0220101 A1 | 10/2005 | Westhoff et al. | |
| 2006/0029084 A1 * | 2/2006 | Grayson | 370/401 |
| 2006/0193344 A1 * | 8/2006 | Nie et al. | 370/466 |

(Continued)

FOREIGN PATENT DOCUMENTS

JP    2001-216263 A    8/2001

(Continued)

OTHER PUBLICATIONS

Sung Don Moon, "PCT/US2009/041947—PCT International Search Report and Written Opinion," WIPO, ISA/KR, Korean Intellectual Property Office, Daejeon, Republic of Korea, Nov. 26, 2009.

*Primary Examiner* — Wayne Cai (57) ABSTRACT

A communication system comprises network elements (103, 105, 107, 109) and user equipments (101), at least some of which comprise a charging proxy (205). The system further comprises a charging server (111) which includes a topic controller (305) for initializing charging topics where each charging topic is associable with charging data. The charging server (111) furthermore comprises functionality for registering proxies as subscribing proxies or publishing proxies (or both) for the different charging topics. A receiver (301, 311) receives charging data messages from charging proxies and validates a first set of charging data belonging to a first charging topic in response to a first set of charging proxies registered as publishing proxies for the first charging topic. A charging data transmitter (313) transmits the first set of charging data to a second set of charging proxies registered as subscribing proxies for the first charging topic.

20 Claims, 4 Drawing Sheets

U.S. PATENT DOCUMENTS

| | | | |
|---|---|---|---|
| 2006/0223508 A1* | 10/2006 | Starr et al. | 455/414.2 |
| 2007/0011281 A1 | 1/2007 | Jhoney et al. | |
| 2007/0041536 A1* | 2/2007 | Koskinen et al. | 379/114.28 |
| 2007/0055566 A1* | 3/2007 | Gaughan et al. | 705/14 |

FOREIGN PATENT DOCUMENTS

| | | |
|---|---|---|
| KR | 10-2003-0005596 A | 1/2003 |
| KR | 10-2004-0104844 A | 12/2004 |
| KR | 10-2005-0054408 A | 6/2005 |

* cited by examiner

CHARGING SYSTEM FOR A COMMUNICATION SYSTEM

FIELD OF THE INVENTION

The invention relates to charging in a communication system and in particular, but not exclusively, to charging for composite communication services.

BACKGROUND OF THE INVENTION

Cellular communication systems for providing, e.g., mobile communication have become ubiquitous over the last decades. For example, $2^{nd}$ Generation systems, such as the Global System for Mobile communication (GSM), and $3^{rd}$ Generation systems, such as the Universal Mobile Telecommunication System (UMTS), have been deployed or are being deployed in most countries. Furthermore, there is a continuous trend towards further improving and enhancing cellular communication systems which have led to the development and standardization of a number of additions or enhancements to the systems.

There is an increasing trend towards providing increasingly flexible and diverse communication services in cellular communication systems. For example, initially $2^{nd}$ Generation communication systems were designed for circuit switched voice communication. However, these systems, as well as newer systems, have increasingly catered for an increasing plethora of different communication services supporting, e.g., packet-based communications, different quality of service communication services, etc. Also, there is an increasing desire to support composite communication services which involve a plurality of different communication entities (infrastructure and devices), parties (e.g., operator, advertiser, Internet Service Provider etc.), business models and service agreements and communication services. A composite service may be a service offering to a consumer (or user) and may require synchronous or asynchronous invocation of a collection of other services of the operator or of independent third-party operators/providers in accordance with joint business interests and pricing policies of operators and providers. Prevalent examples of these services are incentive-based services, location-based content distributions and information dissemination services.

An important aspect of the operation of a cellular communication system is the efficient and accurate billing of users for the provided services. Typically, charging functionality has been implemented using a central charging centre (e.g., located in an operations and maintenance centre) which is fully operated and managed by the network operator. In such systems, the charging centre is fed charging data for all communications, and in response it generates the charging for the individual user. For example, whenever a circuit switched voice call is initialized or terminated, a charging data message, such as a Call Data Record (CRD), is transmitted to the charging centre which accordingly generates the appropriate billing data and allocates it to the individual subscribers.

However, although such an approach is suitable for simpler cellular communication systems providing a relatively small set of communication services, it also tends to have a number of associated disadvantages. Specifically, it tends to be inflexible and complex to implement and operate for more complex systems and communication services. For example, in order to support a specific communication service, the central charging centre must be set up to generate billing data for this communication service. Furthermore, to introduce a temporary or short-term charging change (e.g., a temporary discount if a specific condition is met), the central charging centre must be modified to introduce this discount. However, as correct operation of the charging centre is crucial for maximizing customer satisfaction, it is highly undesirable to have to frequently modify the charging centre operation or functionality. Furthermore, the centralized approach results in the charging information being concentrated either physically at the charging centre or logically under control of one administrative domain and not easily being available or distributable to other interested parties. Thus, sharing or distribution of charging data is not easily achieved.

As a specific example, the conventional charging approach is not optimally suited to dynamic and flexible composite services that involve a plurality of different communication services and dynamic service offerings from a number of different parties.

Hence, an improved charging approach for a cellular communication system would be advantageous and in particular an approach allowing increased flexibility, distributed control, reduced complexity, facilitated operation, increased charging accuracy, improved suitability for dynamic charging variations, improved suitability for communication services, increased customer satisfaction and improved performance would be advantageous.

BRIEF SUMMARY OF THE INVENTION

Accordingly, the Invention seeks to preferably mitigate, alleviate or eliminate one or more of the above mentioned disadvantages singly or in any combination.

The invention may allow improved or facilitated charging in a cellular communication system. In particular, the approach may allow improved flexibility and may for example provide facilitated charging for complex or composite communication services. The charging may more easily be influenced by different parties and entities. The approach may, e.g., facilitate dynamic variations in the charging of the user, such as, e.g., provided by a temporary discount offering paid for by a third party. The charging variations may, e.g., easily be initiated and introduced by third parties.

The charging approach may use a publish/subscribe system for distributing charging information flexibly and dynamically between a number of different entities and parties. For example, the system may allow third-party advertisement providers to flexibly set up incentives for users to consume adverts. The incentives may easily be communicated to individual user equipments and to the network operator thereby allowing the network operator to provide the promised incentive and the user equipments to generate and distribute the required charging information.

The registration of publishing proxies may include an initial registration and authentication of the charging proxy independently of any specific charging topic. This may be followed by a subsequent registration/validation/authentication for individual topics. Similarly, the registration of subscribing proxies may include an initial registration and authentication of the charging proxy independently of any specific charging topic followed by a subsequent registration/validation/authentication for individual topics.

The communication system may specifically be a cellular communication system. The approach may allow both centralized and distributed implementations. For example, some of the functionality of the charging server and the network elements may be distributed over a plurality of different logical, structural or physical network elements or nodes.

These and other aspects, features and advantages of the invention will be apparent from and elucidated with reference to the embodiment(s) described hereinafter.

BRIEF DESCRIPTION OF THE SEVERAL VIEWS OF THE DRAWINGS

Embodiments of the invention are described, by way of example only, with reference to the drawings, in which.

DETAILED DESCRIPTION OF THE INVENTION

Figure 1:
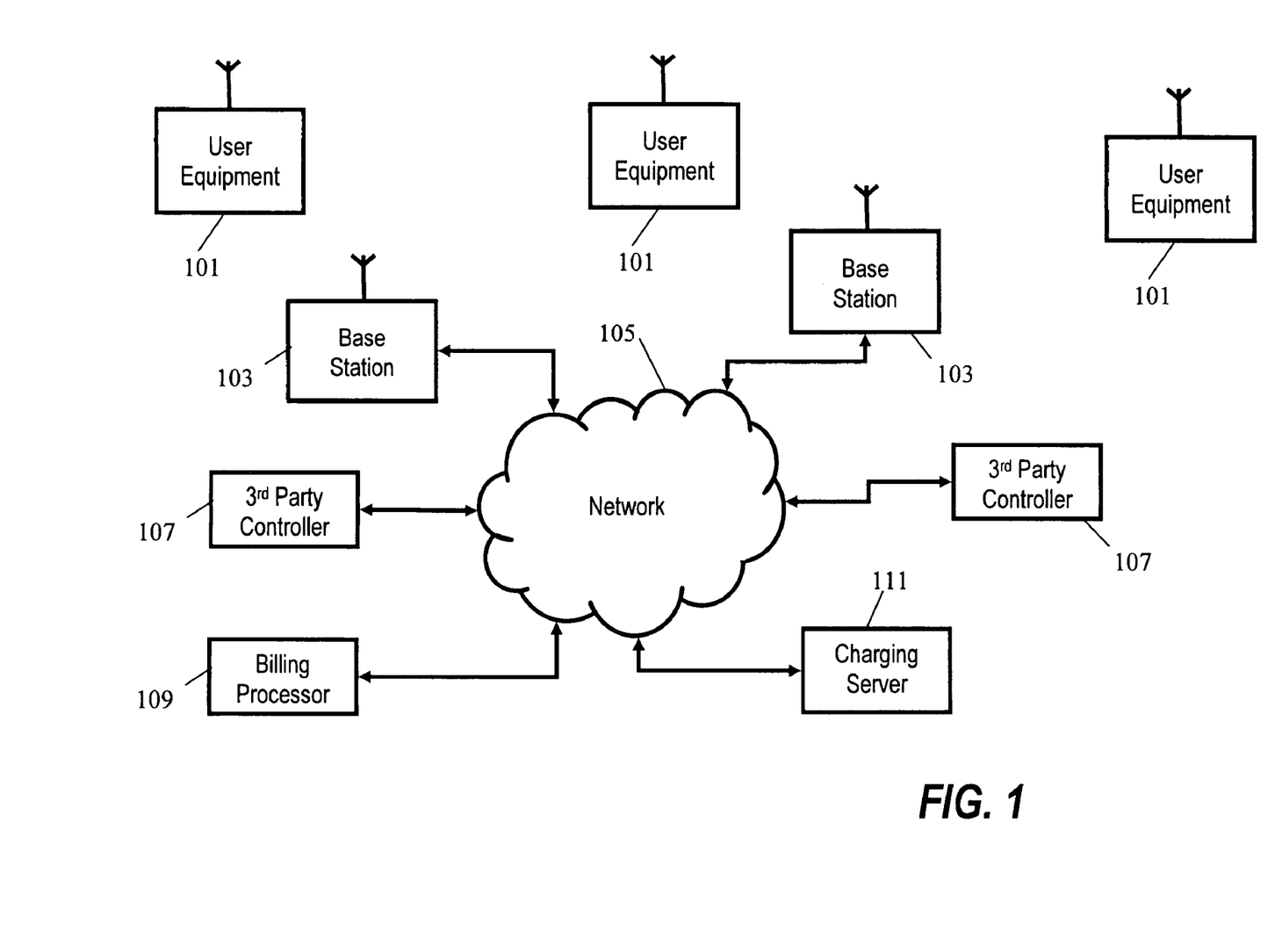
FIG. 1 illustrates an example of a cellular communication system in accordance with some embodiments of the invention.

FIG. 1 illustrates an example of a cellular communication system in accordance with some embodiments of the invention. It will be appreciated that although the following description focuses on embodiments of the invention applicable to a cellular communication system, the invention is not limited to this application but may be applied to many other communication systems.

The cellular communication system may be a GSM/UMTS cellular communication system which supports a plurality of user equipments via radio air interface communications. In other embodiments, the cellular communication system may for example be a cellular communication systems comprising different types of Radio Access Networks (RANs) coupled together via a core network. As another example, the cellular communication system may be a heterogeneous communication system comprising a plurality of (semi-) independent communication systems including for example Wireless Local Area Network (WLAN) RANs (including access points), GSM/UMTS cellular RANs, etc.

In the example, the cellular communication system comprises a number of user equipments 101 (three of which are illustrated in FIG. 1) which can support air interface communications with suitable base stations 103 (including access points). It will be appreciated that in some embodiments, some or all user equipments may be coupled to the network via a non-air interface coupling. For example, a wired phone or computer may be directly coupled to the network of the communication system, e.g., via the Internet or a traditional phone system. A user equipment may be any communication entity capable of communicating using the communication system and specifically of communicating with a base station (or access point) over the air interface including, e.g., a mobile phone, a mobile terminal, a mobile communication unit, a remote station, a subscriber unit, a 3G User Equipment, etc.

The base stations 103 are coupled to a network 105. It will be appreciated that the network 105 may represent all functionality and elements required or desired for the operation of the cellular communication system. In particular, the network 105 may represent all aspects of the fixed segment of the GSM/UMTS communication system including other base stations, Radio Network Controllers, Mobile Switching Centres, GPRS Support Nodes, Visitor Location Registers, Home Location Registers, Wireless or Wired backhaul, Routers, Authentication servers, Gateways, etc. as will be well known to the person skilled in the art.

In FIG. 1, some network elements are for clarity explicitly shown as separate network elements coupled to the network 105. However, although separately illustrated these network elements are part of the network of the cellular communication system which may be considered to include all other elements than the user equipments 101. Thus, FIG. 1 only illustrates some elements as being external to the network in order to make the following description clearer, and no differentiation between these elements or elements of the network 105 are intended.

Specifically, the cellular communication system includes a number of third-party controllers 107 which may provide functionality for interfacing the cellular communication system to third parties. For example, the third-party controllers 107 may allow a third party to distribute information in the cellular communication system. The operation of the third-party controllers 107 is described in more detail below.

Furthermore, the cellular communication system comprises at least one billing processor 109 which is arranged to obtain charging information and generate billing information which is used to bill different users for the consumed communication services.

In addition, the system comprises at least one charging server 111 which is arranged to manage and control distribution of charging information in the system as is described in the following.

It will be appreciated that the base stations 103, third-party controllers 107, billing processor 109, and charging server 111 for clarity are illustrated as network elements coupled to the network 105. However, as previously mentioned it will be appreciated that these network elements may be considered as part of a fixed network for the cellular communication system which may be owned and operated by multiple administrative domains, and that no differentiation is intended by illustrating these network elements externally to the network 105.

In the system of FIG. 1, a flexible management of charging information is provided which allows improved and enhanced charging operations to be performed. For example, the system may provide facilitated and improved charging for composite services or communication services involving different independent RANs and fixed networks. Furthermore, the approach may enable, allow, or facilitate distribution of relevant and permitted charging information to different entities including for example third-party service providers.

In the example of FIG. 1, the charging information generated in different parts of the system is not all transmitted directly to a single billing processor which then proceeds to generate billing records for the individual user. Rather, the system comprises a charging server 111 which manages charging information distribution in the system using a publish/subscribe approach. The charging server 111 can manage a number of charging topics for which various charging proxies can be registered as a publishing proxy thereby allowing the proxy to publish charging data related to this topic. Also, the charging proxies can be registered as subscribing proxies for a specific charging topic thereby allowing the proxies to receive charging data which has been published to this topic. The charging server 111 thus uses the charging topics and the registration of charging proxies therefor to appropriately distribute the charging information in the system.

The cellular communication system of FIG. 1 accordingly uses a publish/subscribe charging system that allows the consumers, operators, and third-party service providers to all publish charging events or subscribe to these as appropriate.

In the system, the individual user equipments and network elements comprise a charging proxy which can generate, process, transmit, or receive call charging data. The individual charging proxies may be registered as publishing proxies providing the call data or may subscribe to a charging topic and accordingly be provided with the charging data associated with this charging topic (or may simultaneously do both).

The applied publish/subscribe approach is an asynchronous messaging paradigm wherein publishing proxies can associate the published charging data with a charging topic rather than address it to specific recipients, i.e., it publishes the data rather than directly transmits them to the destination that requires or desires the data. The publish/subscribe system then either sends the charging data to the subscribers of that specific charging topic or notifies them to pick it up at their convenience.

The publish/subscribe approach provides a loosely coupled architecture in which the publishing proxies do not need to know the identity of the subscribing proxies. Thus, the originating proxy for charging data does not need to know who the recipient is or for what purpose the charging data are required. Rather, the publishing proxies can transmit the charging data to the charging server with an indication of an associated charging topic (i.e., it publishes the charging data) without knowing exactly who may be interested in the data. The subscribing proxies subscribe to the charging data they are interested in through the publish/subscribe system without knowing the identity of the originating publishing proxies.

In the system of FIG. 1, the charging server 111 provides the required functions for implementing the publish/subscribe approach including registration, authentication, access control, publishing, subscription, notification of charging topics, and communication of data from and to subscribing and publishing proxies.

The described publish/subscribe approach provides for a very flexible and generic system for accurate real-time and non-real-time charging of communication services including users' composite services. A composite service is a service whose offering to a user requires synchronous or asynchronous invocation of a collection of other services of the operator or those of independent third-party operators/providers in accordance with joint business interests and pricing policies of the operators and providers.

For example, recently there has been an emergence of incentive-based services where, e.g., advertisements, rewards, and promotions from different parties (e.g., an advertiser, a merchant, an operator, etc.) are used to discount the cost of other communication services. For example, mobile Internet operators and communication service providers can subsidize their services to individuals by carrying advertisements for businesses, enticing users to accept certain preconditions (e.g., opening their home wireless femto-cells to other users in the vicinity) and providing businesses with means of cross promotion of services and products to each other. Depending on their joint business interests and pricing rules, participating operators/providers may create and offer different embodiments of composite services. Specific examples of such composite services can include:

A cellular operator that deploys femto-cells at its customers' premises may charge a lower price for femto-cell services of a customer/user who keep the femto-cells open so that the neighbors and mobile users who are in the vicinity of the femto-cell can use it to access the Internet. This sharing of femto-cells allows the cellular operator to use its femto-cell overlay as a complement to its macro cellular network for offering mobile and over-the-top services.

A user's monthly fee may be lowered in exchange for granting the operator the right to send advertisements, etc. to the user's end-devices. The reduction of the fee may depend on the volume and type of advertisements, whether a user reads them or not, etc.

It is very complex and cumbersome to provide accurate charging for services in such a dynamic system. However, in the system of FIG. 1 such complex service provisions and interrelations between different entities and services can be flexibly and accurately billed using the described publish/subscribe approach. For example, a third party providing advertisements which may reduce the charge for a communication service for all user equipments that consume the adverts may simply via a suitable third-party controller 107 request that a new charging topic is generated for these adverts. In response, the charging server 111 may initiate a topic named, e.g., "Adverts from X" and inform the user equipments 101 of the service/discount. The charging proxy of the third-party controller 107 may then register as both a publishing proxy and a subscribing proxy for the given topic.

Whenever the third party distributes an advertisement, the charging proxy of the third-party controller 107 generates a charging event message and publishes this event to the charging topic "Adverts from X" (i.e., it transmits a message to the charging server 111 with the charging data and identifying the specific topic). Furthermore, any user equipment 101 interested in the discount may register as a publishing proxy for the charging topic and whenever a user consumes an advertisement from X, the charging proxy of that user equipment 101 publishes charging data indicating that an advertisement has been consumed. Specifically, a charging data message may be generated and transmitted to the charging server 111 indicating the charging topic "Adverts from X" and specific data about the consumption (e.g., how many times, for how long, etc.).

The charging server 111 will then (e.g., at regular intervals or when a given event occurs) distribute the charging data for the topic "Adverts from X" to all proxies subscribing to this topic. As the third-party controller 107 is registered as a subscribing proxy, this will also receive the information and can accordingly independently and separately from the network operator determine the total discount to the subscriber and thus the cost to the third party. In addition, the third party may evaluate the consumption of adverts to determine relevant information such as the relative popularity of different adverts, etc. In some embodiments, the charging server 111 does not automatically transmit the charging data for a topic to all subscribing proxies but rather transmits a notification of the available data to the subscribing proxies. The individual subscribing proxies may then specifically request charging data as and when they need them. Thus the charging server 111 may transmit the charging data to subscribing proxies in response to specific requests from the subscribing proxies.

Also, the billing processor 109 may be registered as a subscribing proxy for the topic "Adverts from X" and thus it will receive all the charging information necessary to calculate the discount for the individual user. Furthermore, the charging proxy of the billing processor 109 may be registered as a subscriber for other charging topics, such as charging topics for various communication services.

Accordingly, it may use charging data for these charging topics to calculate a cost for the individual user for the consumed communication services. This cost may then be offset by the calculated discount to generate a final billing for the individual user. In some embodiments, the charging proxy of the billing processor 109 may automatically be registered as a subscribing proxy for all charging topics thereby allowing the billing processor 109 to be provided with all information necessary to generate bills for all users.

Hence, a very flexible and adaptable charging system can be implemented allowing a timely and efficient acquisition of charging data across multiple autonomous administrative domains in order to bill the individual communication user as well as the third parties that provide the incentive.

As a more detailed example, a composite service may include three parties, namely the consumer, the network operator, and the third-party service provider which in the specific example may be a department store (or, e.g., an advertising company). The relevant financial considerations may in this case include:

If the consumer accepts to receive adverts whenever he uses the service, the operator discounts his monthly bill (e.g., proportionally to the number of adverts that are consumed). An advert may be considered to be consumed if the consumer handles or manipulates it in a given way. For instance, an advertisement may be displayed when the consumer browses the web, or after a caller initiates a session just before displaying the busy/ringing signal from the called party, etc. However, the advert is in this example not considered consumed until the consumer performs a particular action in response to the advert, e.g., answers a quiz question, etc.). The consumer may have the option to decide whether to display an advertisement or not, and his choice may affect the discount amount. More specifically, the consumer may be allowed to select the type of advertisements that he would like to receive and may delete them upon reception. However, in the example the discount will be proportional to number of adverts that are actually consumed by the user.

The cellular network operator charges the department store a fee for delivering each copy of the advert to a consumer. This fee may depend on the time of day, location of the consumer, the number of different recipients, etc.

The department store may offer a 5% discount on a product, if the consumer buys it within 24 hours of receiving the advert.

In this example, the publish/subscribe charging system may include the following actions:

The department store informs the charging server 111 of the offered service/discount, and in response a charging topic is generated.

To take advantage of the service, the users are notified of the department store's adverts and of the associated charging topic. The individual user equipment charging proxy can then register for the associated charging topic if it is interested in the adverts. The user equipment may register as a subscribing charging proxy if this is used to distribute the adds or may in some cases register only as a publishing proxy in order to transmit charging data when adverts are consumed.

To provide the discount to the consumer and to bill the department store for the discount, the charging proxy of the billing system of the cellular network operator is registered as a subscribing charging proxy and accordingly is provided with information of which adverts are consumed, by whom, etc. As a specific example, the billing processor 109 may be provided with (or itself generate) a histogram of the number of consumed adverts as a function of the time of day and the location of the user.

Furthermore, in order to bill the department store for distributing advertisements, the billing processor 109 receives charging data related to the distribution of the adverts. In particular, the cellular network operator may be provided with (or generate) an aggregated histogram of the number of distributed adverts as a function of the time of day, the user location, etc.

The department store is via the registration of the charging proxy of the third-party controller 107 as a subscribing charging proxy provided with information relating to both the consumed adverts and the distribution of adverts. This information may allow the department store to independently calculate the cost to the department store (e.g., to verify the billing from the network operator or to generate current cost estimates). Indeed, the information may be used dynamically by the department store to adjust the offering. For example, if only a few adverts are consumed, the department store may dynamically and in real time increase the provided discount in order to provide a further incentive to the users. Also, the department store may use this information to provide an offered product discount, e.g., based on the time of consumption of the advertisement.

By implementing the charging of composite services as publish/subscribe activities where all involved parties and entities can be publishers or subscribers, a very flexible approach can be achieved. For example, the system may, as illustrated by the specific example, easily allow different entities to receive identical charging data, e.g., information regarding the transmitted/consumed adverts for the composite service, although they may process the data very differently. This can furthermore be achieved without requiring any modification or even knowledge thereof by the entity generating the charging information.

The asynchronous messaging paradigm of publish/subscribe suits the charging needs of composite services better than the point-to-point and transaction-based messaging paradigms of conventional systems. In particular, it may allow a flexible distribution of data to the appropriate entities which can easily and dynamically be adapted and modified as required. Furthermore, the management and operational overhead of this distribution is low in comparison to conventional systems.

Thus, in the system of FIG. 1 at least some and potentially all user equipments comprise a charging proxy which can support the publish/subscribe charging approach. Similarly, some or all of the network elements may comprise charging proxies which can support the publish/subscribe charging approach. E.g., a Master Switch Centre (MSC) or a Serving GPRS Support Node (SGSN) may comprise a charging proxy that can be registered as a publishing charging proxy and publish charging data for specific charging topics.

Furthermore, in the example, one or more third-party service provision network elements capable of supporting a service to users of the cellular communication system not provided by the cellular network operator may comprise a charging proxy that can be registered as a publishing or subscribing charging proxy or both. In the illustration of FIG. 1, such elements are represented by the third-party controllers 107.

Also, in the example, the cellular communication system comprises at least one network operator billing network element which is capable of generating billing records for the individual users of the cellular communication system. Thus, the network operator billing network element is controlled by the cellular network operator and is capable of processing received charging information to generate bills for the users and consumers (e.g., at a weekly or monthly interval). The network operator billing network element comprises a charging proxy which can operate in accordance with the publish/ subscribe approach or paradigm. Specifically, in many embodiments the entire network operator billing network element may be considered a single charging proxy. In the illustration of FIG. 1, the billing processor 109 represents a network operator billing network element.

Figure 2:
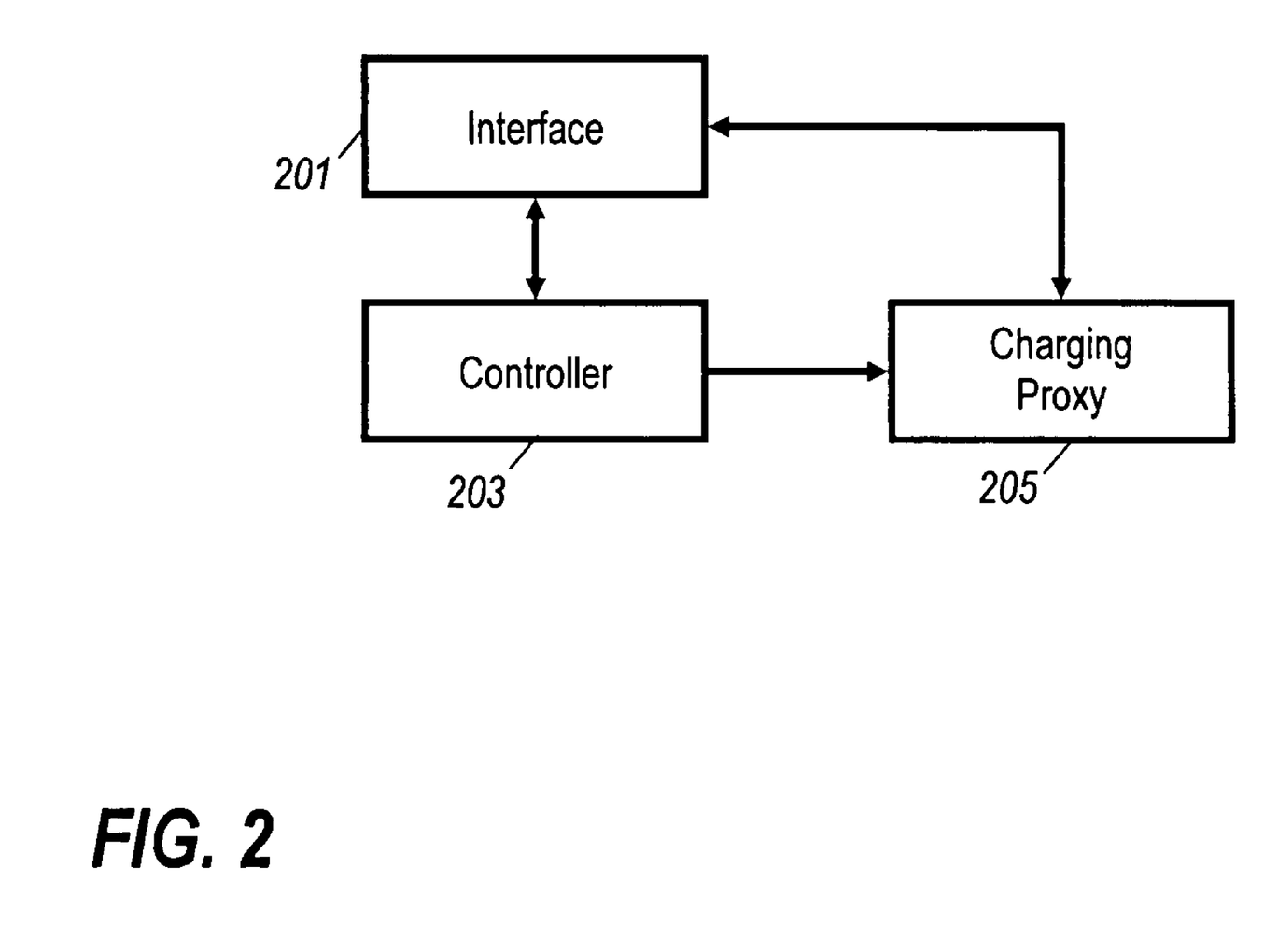
FIG. 2 illustrates an example of a network element or user equipment for a cellular communication system in accordance with some embodiments of the invention.

FIG. 2 illustrates a generalized example of a network element or user equipment capable of supporting the described publish/subscribe approach. The network element or user equipment comprises an interface 201 which is capable of interfacing the entity to the rest of the communication system. For example, for a user equipment, the interface 201 may be a transceiver capable of communicating over the air interface of the communication system. For a network element, the interface 201 may be a network interface capable of communicating with other network elements (e.g., of the network 105).

The interface 201 is coupled to a controller 203 which controls the operation of the network element or user equipment. Specifically, the controller 203 may control the communication activities of the entity and may for a user equipment manage the communication services used by the user equipment, etc.

The interface 201 and controller 203 are coupled to a charging proxy 205 which monitors the operation of the entity. The charging proxy 205 may support the publish/subscribe charging approach and may specifically register with the charging server 111 as a publishing or subscribing (or both) charging proxy for specific charging topics.

The charging proxy 205 is for example capable of detecting when specific events occur that may impact the charging for the user (e.g., that a new communication is set up, that a communication is terminated, that a given amount of data has been communicated, that a specific message is received, that an advert has been consumed, etc.). Furthermore, when a specific charging event occurs, the charging proxy 205 may generate a suitable charging data message comprising an identification of one or more charging topics to which the charging data of the message relates. It can then proceed to transmit the charging data message to the charging server 111.

The charging proxy 205 may also be able to receive charging data from the charging server 111 and to process this appropriately. For example, the charging proxy 205 may forward the received charging data to another entity or network element. E.g., for a third-party controller 107, the charging proxy 205 may receive information of events that correspond to an advert from the third party being consumed by a user. Accordingly, it may group these events together (e.g., one group for each advert) and provide the statistically processed information to the third-party service provider.

It will be appreciated that a charging proxy may be any functionality capable of processing data relevant to or associated with charging in a cellular communication system. In the system of FIG. 1, a charging proxy may specifically be any functionality which is capable of transmitting or receiving data to or from the charging server 111. A charging proxy may for example be implemented as an executable program running on a suitable processing element such as a microprocessor, micro controller, digital signal processor, or similar device.

In the example of FIG. 1, a charging proxy is a publish/subscribe messaging entity that resides within user equipments as well as the network operator and third-party controllers (such as application servers) and is responsible for:

- registration of the entity with charging server 111 either as a subscribing charging proxy or a publishing charging proxy (or both);
- receiving charging data from the charging server 111 for charging topics for which the charging proxy is registered as a subscribing charging proxy; and
- transmitting to the charging server 111 charging data for charging topics for which the charging proxy is registered as a publishing charging proxy.

Figure 3:
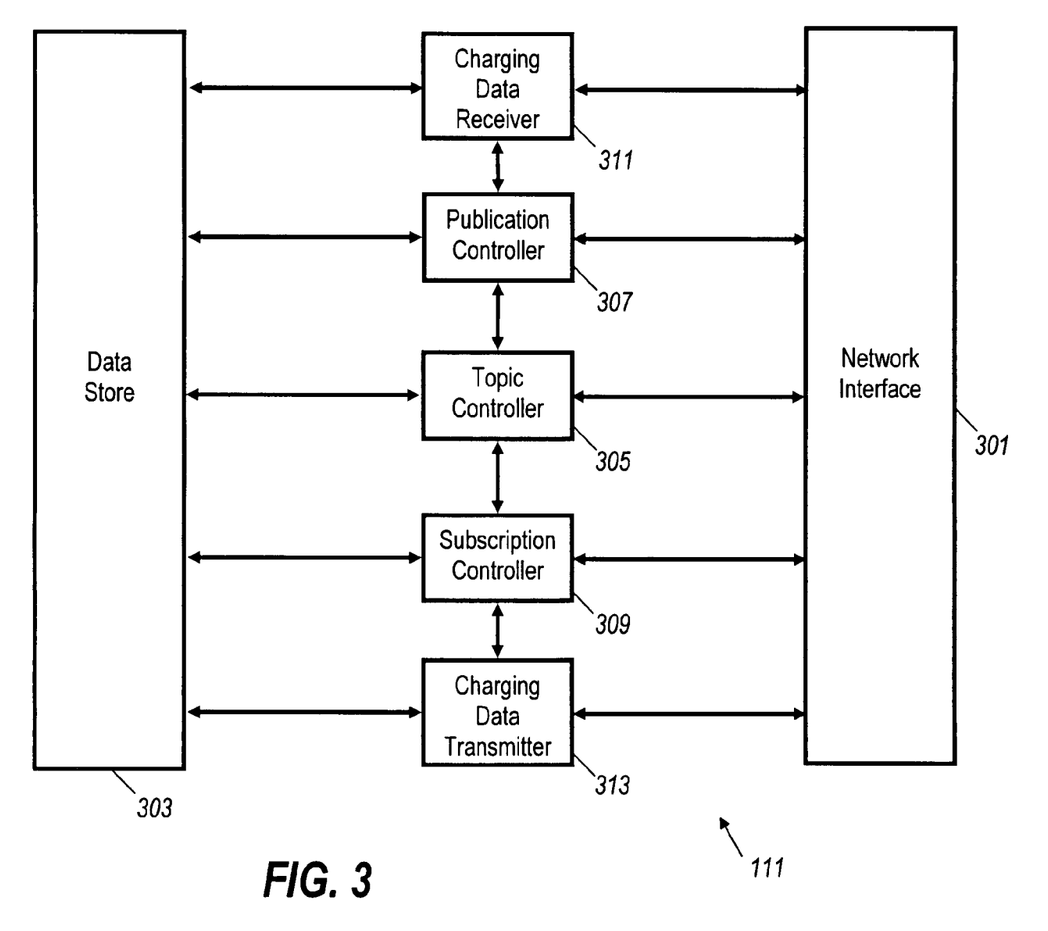
FIG. 3 illustrates an example of a charging server in accordance with some embodiments of the invention.

FIG. 3 illustrates the charging server 111 in more detail.

The charging server 111 comprises a network interface 301 which interfaces the charging server 111 to the network 105 and which specifically is arranged to transmit and receive charging data from other elements of the cellular communication system include user equipments 101. The charging server 111 furthermore comprises a data store 303 which is arranged to store received charging data, registration data, authentication data, charging topic data, etc.

Although, the example for clarity and brevity illustrates a single data store 303 in the charging server 111, it will be appreciated that the data may be distributed over a plurality of network elements and in particular that the data store 303 may be implemented as a distributed database.

The charging server 111 comprises a topic controller 305 coupled to the network interface 301 and to the data store 303. The topic controller 305 is operable to control and manage charging topics and is in particular operable to initialize new charging topics.

In the specific example, a number of charging topics may be defined by the topic controller 305. For example, a number of predefined charging topics may be defined for the cellular communication system. For example, charging topics may be predefined for different communication services that are known to be supported in the cellular communication system. E.g., a charging topic may be predefined for a circuit-switched voice call, another for a packet-based Internet access service, etc.

In addition, the topic controller 305 may be operable to dynamically initialize and terminate charging topics. For example, when a third-party provider wants to introduce a new service or offering, such as a discount in response to a consumption of adverts, the third-party operator may instigate the charging proxy of the appropriate third-party controller 107 to transmit a charging topic setup request to the charging server 111. In response, the topic controller 305 may create a charging topic for the specific service or offering. For example, the topic controller 305 may setup a charging topic for adverts from the third party.

The charging topic setup request may furthermore specify a number of parameters and characteristics associated with the charging topic. For example, the charging topic setup request may describe the discounts offered (e.g., as a function of adverts consumed, characteristics of the adverts, etc.).

The topic controller 305 is furthermore arranged to broadcast charging topic characterizing data messages for the charging topics to the charging proxies. For example, whenever a new charging topic is set up, the topic controller 305 transmits data identifying this charging topic to all charging proxies registered with the charging server 111. Additionally or alternatively, the topic controller 305 may at regular intervals transmit characterizing data identifying the charging topics that are currently set up or active.

Thus, the charging server 111 may notify the various charging proxies of the charging topics that may currently be used (or which should be used).

The charging topic characterizing data messages may in addition to data identifying the charging topic also comprise characterizing data that describe various parameters and aspects of the topic. For example, characterizing data that describe the available incentive may be included (such as the discount attainable by consuming adverts), the originating party may be identified (e.g., the name of the department store), etc.

As a specific example, the characterizing data may comprise requirement data for publishing proxies to be registered for the charging topic. The requirement data may define various requirements that must be met by a charging proxy (or associated subscriber) in order for the charging proxy to be allowed to become a publishing proxy. This information may then allow the individual charging proxies to evaluate whether they may apply to become publishing proxies for the charging topic.

As another example, the characterizing data may comprise requirement data for subscribing proxies to be registered for the charging topic. The requirement data may define various requirements that must be met by a charging proxy (or associated subscriber) in order for the charging proxy to be allowed to become a subscribing proxy. This information may then allow the individual charging proxies to evaluate whether they may apply to become subscribing proxies for the charging topic.

As another example, the characterizing data may comprise charging event reporting requirement data for the first charging topic. This may allow a flexible and dynamic control and management of the collection of appropriate data necessary or desired for the specific charging. For example, the charging event reporting requirement data for the previous exemplary topic may comprise a requirement that any publishing charging proxies report any charging event corresponding to an advert being consumed (including, e.g., a specification of which operation or manipulation of the advert is required for it to be considered consumed by the user).

The charging topic characterizing data message for a given topic may thus comprise various information that allows the individual charging proxies to decide whether to subscribe to the topic, how to operate to support the charging for a given service, etc.

The characterizing data may be fully or partially generated and selected by the charging server 111. Alternatively or additionally, the characterizing data may originate at a charging proxy that initiated the charging topic setup.

For example, when a third-party controller 107 transmits a charging topic setup message it may include a description of the provided incentive as well as the reporting requirements for the charging proxies (e.g., defining what operation on the adverts should be reported). This information may be included in the charging topic characterizing data message distributed to the charging proxies. As another example, characterizing data may be received from other publishing charging proxies and included in the charging topic characterizing data messages. For example, if a discount is provided for a given total number of adverts being consumed by a group of users, the characterizing data may include an indication of how many adverts have previously been consumed by other users in the group.

The charging server 111 furthermore comprises a publication controller 307 coupled to the network interface 301 and to the data store 303. The publication controller 307 is arranged to register proxies of the charging proxies as publishing proxies.

Specifically, in response to the distribution of the charging topic characterizing data messages, the charging proxies in the system may request to be registered as publishing proxies. For example, a user equipment 101 may determine that it is interested in obtaining a discount for consuming adverts and may therefore transmit a publication proxy request to the charging server 111 for the charging topic associated with such discounts. This message is forwarded to the publication controller 307 which proceeds to determine whether the user equipment 101 can be accepted as a publishing proxy. If so, a publishing proxy permission is transmitted to the user equipment 101, otherwise a rejection is transmitted. If the user equipment 101 is accepted as a publishing proxy for the topic, it will proceed to transmit charging data messages to the charging topic, and the charging server 111 will distribute them to the subscribing charging proxies for the system.

The topic controller 305 may evaluate the received publication proxy requests against a number of requirements and criteria. Specifically, it will be appreciated that the publication controller 307 may perform authentication and validation of the user equipment 101 in accordance with any suitable method or algorithm.

For example, the publication controller 307 may retrieve subscription information from a Home Location Register of the cellular communication system to verify that the user equipment 101 is a valid subscriber to the system. Furthermore, the publication controller 307 may retrieve specific publication proxy requirements for the specific charging topic from the data store 303 and may evaluate if these requirements are met by the user equipment 101 seeking to register as a publishing charging proxy. This information may for example be received from an originating third-party controller 107 when instigating the charging topic thereby allowing third parties providing a service/offering to control who that service/offering is provided to.

The charging server 111 also comprises a subscription controller 309 coupled to the network interface 301 and to the data store 303. The subscription controller 309 is arranged to register proxies of the charging proxies as subscriber proxies.

Specifically, in response to the distribution of the charging topic characterizing data messages, charging proxies in the system may request to be registered as subscriber proxies. For example, the billing processor 109 may identify that it needs to consider the charging topic associated with a discount in order to provide correct billing for the user, and it may therefore transmit a subscription proxy request to the charging server 111 to become a subscribing proxy for the corresponding charging topic. As another example, one or more of the third-party controllers 107 may request to become a subscriber proxy in order to evaluate the response of the users to the provided discount and adverts. In particular, the originating third-party controller 107 may request to become a subscribing charging proxy.

Such requests are forwarded to the subscription controller 309 which proceeds to determine whether the requesting entity can be accepted as a subscribing proxy. If so, a subscribing proxy permission is transmitted to the entity, otherwise a rejection is transmitted.

The topic controller 305 may evaluate the received subscription proxy requests against a number of requirements and criteria. Specifically, it will be appreciated that the subscription controller 309 may perform authentication and validation of the user equipment 101 in accordance with any suitable method or algorithm.

For example, the subscription controller 309 may retrieve authentication information from an operations and management centre of the cellular communication system to verify that the entity is a valid operator entity. Furthermore, the subscription controller 309 may retrieve specific subscription proxy requirements for the specific charging topic from the data store and may evaluate if these requirements are met by the entity seeking to register as a subscribing charging proxy. This information may for example be received from an originating third-party controller 107 when instigating the charging topic thereby allowing third parties providing a service/offering to control who receives information associated with that service/offering.

It will be appreciated that any suitable criteria, rules, and algorithms for subscribing charging proxies may be used. For example, a general rule may be set up that the billing processor 109 is registered as a subscribing proxy for all charging topics. As another example, a general rule may be set up that only an originating charging proxy of a third-party controller 107 may be registered as a subscribing charging proxy.

The charging server 111 furthermore comprises a charging data receiver 311 which is coupled to the network interface 301, to the data store 303, and to the publication controller 307. The charging data receiver 311 receives all charging data messages transmitted to the charging server 111 from the charging proxies.

For each received message, the charging data receiver 311 first identifies the charging topics identified in the charging data message. It then proceeds to evaluate if the originating charging proxy is registered as a publishing proxy for the charging topics. If so, the charging data receiver 311 proceeds to store the received charging data in the data store 303 (with an indication of the charging topic). Otherwise the charging data are simply rejected or ignored. Thus, for each charging topic the data store 303 stores a set of associated charging data received from validated publishing proxies for the charging topic.

The charging server 111 also comprises a charging data transmitter 313 which is coupled to the network interface 301, to the data store 303, and to the subscription controller 309. At suitable times, the charging data transmitter 313 proceeds to retrieve the set of data for a given topic from the data store. It furthermore retrieves a list of subscribing proxies from the subscription controller 309 and proceeds to transmit the set of data to all the subscribing proxies.

It will be appreciated that the transmission of charging data by the charging data transmitter 313 may be performed at any suitable time and frequency. For example, the transmission of charging data for a given charging topic may be performed at regular intervals or may, e.g., be performed whenever a given event occurs. For example, whenever new charging data are received for a charging topic, they may instantly be distributed to all proxies subscribing to this topic.

It will also be appreciated that in some embodiments, not all received charging data are distributed to all subscribing proxies. A subscribing proxy receives only data regarding topics that it has subscribed to and may in some scenarios receive only part of the published data for a topic it has subscribed to. For example, the charging data transmitter 313 may filter data in accordance with any suitable criterion before transmitting to the subscribing proxies. For example, the billing processor 109 may be provided with all information relating to a charging topic, whereas the third-party controller 107 may only be provided with a selected subset thereof.

Thus the charging server 111 is in the example a publish/subscribe entity which comprises the necessary functionality for:
  receiving the registration, publishing, subscription, and notification requests from charging proxies;
  processing and sending responses to registration, subscription, publication, and notification requests from charging proxies;
  notifying subscribing proxies about charging events for charging topics they are subscribed to;
  allowing subscribing proxies to discover charging events provided by publishing proxies; and
  acting as an intermediary for routing and distributing messages between the system billing processors and the charging proxies.

The charging server 111 may be owned and operated by the network operator or, e.g., by a $3^{rd}$ party that has mutual trust relations with all involved parties.

In the system of FIG. 1, the billing processor 109 receives charging data associated with all charging topics generated by the charging server 111. The billing processor 109 uses this information to generate billing data for the individual consumer.

Specifically, the billing processor 109 may use the charging data to determine a cost for a specific communication service in response to the charging-data messages and the charging topics. For example, the charging server 111 may define a charging topic corresponding to a (standard) voice communication. Accordingly, the billing processor 109 may receive charging data for this charging topic that describe all voice communications occurring in the system (or the part of it controlled by the billing processor 109). The billing processor 109 may accordingly generate a cost for (standard) voice communication services for a specific user equipment 101 by extracting all charging data for this topic originating from the charging proxy of that user equipment 101. The charging data may for example include data defining the time of each call, the duration of each call, the destination of each call, etc. Accordingly, this information may be associated with a cost, and the total cost will be generated by summing the costs of the individual calls.

Furthermore, in some scenarios, the billing processor 109 may combine charging data from a plurality of charging topics when generating the charging data for a given communication service. For example, a third-party provider may have offered a discount if a user consumes a given number of adverts, and a corresponding charging topic may have been setup. Thus, the billing processor 109 may also evaluate this charging topic when determining a cost for voice communications. In particular, in response to the notification of the charging topic being initiated by the charging server 111, the billing processor 109 may adjust the algorithm for calculating voice communication cost to also consider the associated charging topic. Accordingly, when calculating the cost, the billing processor 109 can proceed to evaluate the charging topic to identify how many adverts have been consumed by the user. If this exceeds the required number (e.g., as identified in the notification of the new charging topic), the billing processor 109 may proceed to discount the calculated cost by the appropriate amount (e.g., also identified in the notification of the new charging topic).

Thus, a very flexible and efficient approach for charging is provided. The approach may be dynamically adapted to take into account new, dynamic offerings to be introduced by third parties. The system thus allows an adaptable and ad-hoc charging approach allowing the charging to be modified by many different parties. In particular, the system allows efficient charging for composite communication services which comprise a plurality of different communication services. Indeed, for such services, the different communication services may be individually managed and controlled using individual charging topics for each communication service while allowing an efficient combined cost calculation by the charging functionality combining data from the relevant charging topics.

Furthermore, the system allows for a practical and efficient management of charging considerations that include several different origins of the relevant charging data. For example, the billing processor 109 may combine charging data from a plurality of charging proxies when generating charging data for a communication service. Indeed, as a given charging topic may comprise charging data from publishing proxies of different elements, the billing processor 109 may easily combine such data to generate suitable charges. For example, the charging data from the user equipment charging proxy describing the consumed adverts may be combined with the current discount value associated with consumed adverts as provided by the charging proxy of the third party operating as a publishing proxy for the topic.

In the described example, the charging server 111 merely operates as a repeater or distribution central for charging data. However, it will be appreciated that in some embodiments, the charging server 111 may also process or manipulate the charging data.

For example, in some embodiments the described combining of data from different charging proxies or for different charging topics may fully or partially be performed in the charging server 111. For example, the charging server 111 may combine the discount value charging data from the third-party charging proxy and the consumed advert data from a user equipment charging proxy to generate a discount value that should be provided to the corresponding user. This discount value may then be transmitted to the billing processor 109 which may proceed to apply the discount when billing the user. Alternatively or additionally, the discount value may be transmitted to the base station 103.

Thus, the charging data from a plurality of charging data messages for a first charging topic may be combined into composite charging data. For example, all data messages indicating that a given advert has been consumed may by the charging server 111 be combined into a single message indicating how many adverts have been consumed by a given user (or, e.g., by all users). This information may then be transmitted to the subscribing proxies for the specific charging topic.

In some embodiments, the combining of data may also be performed in a charging proxy itself. For example, a publishing proxy may not transmit a charging data message every time an advert is consumed but may, e.g., transmit a data message indicating how many adverts have been consumed in a given time interval (say a day or a week). As another example, a subscribing proxy may combine data before further processing, e.g., to obtain statistical data representative of the consumption of adverts by the users.

The described system may provide a number of advantages including in many scenarios one or more of the following:

- It may provide a common platform for on-line and off-line charging of composite services offered through the collaboration of multiple autonomous parties (e.g., operators, advertisers, content providers, etc.).
- It may be particularly amenable to roaming scenarios. For example when a consumer of a composite service roams into a visited network, he may receive adverts from department-store branches in the visited domain area in accordance with the rules defining the composite service.
- It may provide anonymity for the individual user or third party with respect to other parties.
- It tends to be more bandwidth efficient than conventional charging systems using point-to-point messaging where the involved parties directly exchange charging information.
- It can be deployed in both centralized and distributed (e.g., peer-to-peer) environments.
- It may provide a source of charging information that suitable parties may access for statistical information.

Figure 4:
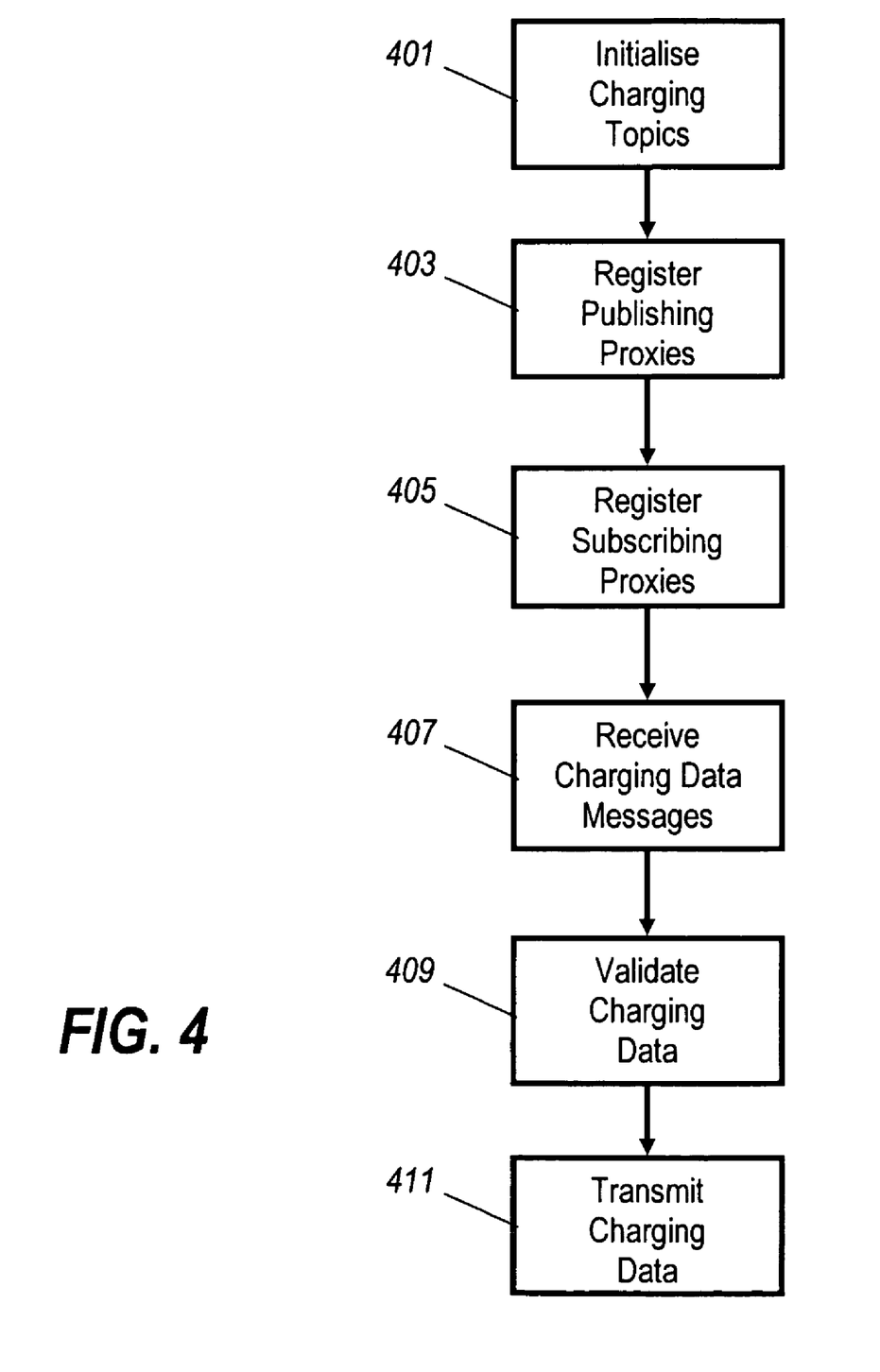
FIG. 4 illustrates a method of charging for a cellular communication system in accordance with some embodiments of the invention.

FIG. 4 illustrates a method of charging for a cellular communication system in accordance with some embodiments of the invention. The cellular communication system includes a plurality of network elements of a fixed network of the cellular communication system and a plurality of user equipments of the cellular communication system. At least some of the plurality of network elements and the plurality of user equipments comprise a charging proxy.

The method initiates in step 401 wherein charging topics are initialized with each charging topic being associable with charging data.

Step 401 is followed by step 403 wherein proxies of the charging proxies are registered as publishing proxies.

Step 403 is followed by step 405 wherein proxies of the charging proxies are registered as subscribing proxies.

Step 405 is followed by step 407 wherein charging data messages are received from charging proxies.

Step 407 is followed by step 409 wherein a first set of charging data belonging to the first charging topic is validated in response to a first set of proxies registered as publishing proxies for the first charging topic.

Step 409 is followed by step 411 wherein the first set of charging data is transmitted to a second set of proxies registered as subscribing proxies for the first charging topic.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware, or any combination of these. The invention may optionally be implemented at least partly as computer software running on one or more data processors or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, or method steps may be implemented by, e.g., a single unit or processor. Additionally, although individual features may be included in different claims, these may possibly be advantageously combined, and the inclusion in different claims does not imply that a combination of features is not feasible or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked, and in particular the order of individual steps in a method claim does not imply that the steps must be performed in this order. Rather, the steps may be performed in any suitable order.

We claim:

1. A charging system for a communication system, the charging system comprising:
   a plurality of network elements of a fixed network of the communication system;
   a plurality of user equipments of the communication system, at least some of the plurality of network elements and the plurality of user equipments comprising a charging proxy; and
   a charging server comprising:
      a topic controller for initializing charging topics, each charging topic being associable with charging data,
      a publication controller for, for each of the charging topics, registering proxies of the charging proxies as publishing proxies,
      a subscription controller for, for each of the charging topics, registering proxies of the charging proxies as subscribing proxies,
      a receiver for receiving charging data messages from proxies,
      a charging data receiver for validating a first set of charging data belonging to a first charging topic in response to a first set of charging proxies registered as publishing proxies for the first charging topic, and
      a transmitter for transmitting the first set of charging data to a second set of charging proxies registered as subscribing proxies for the first charging topic.

2. The charging system of claim 1 wherein the charging data receiver is arranged to include charging data of charging data messages in the first set of charging data only for charging data messages received from charging proxies of first set of charging proxies.

3. The charging system of claim 1 wherein the plurality of network elements comprises at least one network element selected from the group consisting of: a network operator billing network element and a third-party service provision network element.

4. The charging system of claim 1 wherein at least some of the charging proxies are arranged to transmit a charging event message in response to a detection that a charging condition has been met, the charging event message being associated with a charging topic.

5. The charging system of claim 1 wherein the charging server is arranged to distribute reporting requirements for the first topic to at least the first set of charging proxies, and wherein each charging proxy of the first set of charging proxies is arranged to generate charging data messages in response to the reporting requirements.

6. The charging system of claim 1 wherein at least some of the charging proxies are arranged to transmit a charging topic setup request to the charging server; and wherein the topic controller is arranged to initialize a charging topic in response to receiving the charging topic setup request.

7. The charging system of claim 1 wherein the transmitter is arranged to broadcast charging topic characterizing data messages for the charging topics to the charging proxies.

8. The charging system of claim 7 wherein the broadcast charging topic characterizing data message for a first charging topic comprises characterizing data for the first charging topic originating from at least one of a publishing charging proxy and an originating charging proxy for the first charging topic.

9. The charging system of claim 7 wherein at least some of the charging topic characterizing data messages comprise data selected from the group consisting of: requirement data for publishing proxies for a charging topic, requirement data for subscribing proxies for a charging topic, and charging event reporting requirement data for a charging topic.

10. The charging system of claim 1 further comprising:
    a billing processor for generating communication service charging data for at least one communication service in response to the charging data messages and the charging topics.

11. The charging system of claim 10 wherein the billing processor is arranged to combine charging data for a plurality of charging topics when generating the communication service charging data for the at least one communication service.

12. The charging system of claim 10 wherein the at least one communication service is a composite communication service comprising a plurality of different communication services at least some of which are associated with different charging topics of a plurality of charging topics.

13. The charging system of claim 10 wherein the billing processor is arranged to combine charging data from a plurality of charging proxies when generating the communication service charging data for the at least one communication service.

14. The charging system of claim 1 wherein at least one of the charging topics relates to at least one parameter selected from the group consisting of: a communication service, a third-party identity, a charging discount, and an advertisement activity.

15. The charging system of claim 1 wherein the charging server is arranged to combine charging data from a plurality of charging data messages for a first charging topic into composite charging data; and wherein the transmitter is arranged to transmit the composite charging data to subscribing proxies for the first charging topic.

16. A charging server for a communication system, the communication system including a plurality of network elements of a fixed network and a plurality of user equipments, at least some of the plurality of network elements and the plurality of user equipments comprising a charging proxy, the charging server comprising:
    a topic controller for initializing charging topics, each charging topic being associable with charging data;
    a publication controller for, for each of the charging topics, registering proxies of the charging proxies as publishing proxies;
    a subscription controller for, for each of the charging topics, registering proxies of the charging proxies as subscribing proxies;
    a receiver for receiving charging data messages from charging proxies;
    a charging data receiver for validating a first set of charging data belonging to a first charging topic in response to a first set of charging proxies registered as publishing proxies for the first charging topic; and
    a transmitter for transmitting the first set of charging data to a second set of charging proxies registered as subscribing proxies for the first charging topic.

17. A method of operation for a communication system, the communication system including a plurality of network elements of a fixed network and a plurality of user equipments, at least some of the plurality of network elements and the plurality of user equipments comprising a charging proxy, the method comprising:

initializing charging topics, each charging topic being associable with charging data;

for each of the charging topics, registering proxies of the charging proxies as publishing proxies;

for each of the charging topics, registering proxies of the charging proxies as subscribing proxies;

receiving charging data messages from proxies;

validating a first set of charging data belonging to a first charging topic in response to a first set of charging proxies registered as publishing proxies for the first charging topic; and     transmitting the first set of charging data to a second set of charging proxies registered as subscribing proxies for the first charging topic.

18. The method of claim 17 further comprising:

distributing reporting requirements for the first topic to at least the first set of charging proxies.

19. The method of claim 17 further comprising:

initializing a charging topic in response to receiving a charging topic setup request.

20. The method of claim 17 further comprising:

combining charging data from a plurality of charging data messages for the first charging topic into composite charging data; and transmitting the composite charging data to subscribing proxies for the first charging topic.

\* \* \* \* \*